Aug. 10, 1965   J. BOCHAN ETAL   3,199,649
CENTRIFUGAL TYPE CLUTCH WITH MASS VARYING MEANS
Filed Jan. 28, 1963   4 Sheets-Sheet 1

INVENTORS
JOHN BOCHAN
& JOHN W. TOMA
BY
THEIR ATTORNEY

Aug. 10, 1965  J. BOCHAN ETAL  3,199,649
CENTRIFUGAL TYPE CLUTCH WITH MASS VARYING MEANS
Filed Jan. 28, 1963  4 Sheets-Sheet 3

INVENTORS
JOHN BOCHAN
& JOHN W. TOMA
BY
*Drek P Lawrence*
THEIR ATTORNEY

United States Patent Office 3,199,649
Patented Aug. 10, 1965

3,199,649
CENTRIFUGAL TYPE CLUTCH WITH MASS
VARYING MEANS
John Bochan and John W. Toma, Louisville, Ky., assignors to General Electric Company, a corporation of New York
Filed Jan. 28, 1963, Ser. No. 254,321
6 Claims. (Cl. 192—105)

This invention relates to centrifugal clutches, and more particularly to such clutches which are capable of providing selectively different speeds.

It is an object of our invention to provide a new and improved multi-speed clutch wherein use is made of centrifugal force in order to obtain different speeds, yet wherein centrifugal force has no effect on the torque transmission at top speed.

A further more specific object of our invention is to provide such a clutch wherein centrifugally responsive members are mounted on the driven member of the clutch.

Yet a further specific object of our invention is the provision of a centrifugally operated clutch which automatically provides greater torque transmission for one direction of rotation than the other.

Another object of our invention is the incorporation of such a clutch, with greater torque transmission in one direction than the other, in an appliance such as a washing machine which provides one direction of rotation for washing operations and the opposite direction of rotation for centrifugal liquid extraction operations. In such machines it is important that the washing operations be provided substantially without any slipping of the clutch, that is, with maximum torque transmission, and equally important that there be slipping of the clutch under heavy load during acceleration from a stop to full spinning speed when the machine is to provide an extraction operation.

In carrying out our invention in one form thereof, we provide a multi-speed clutch with an input drum and a driven output member coaxial with the drum. A clutch shoe is pivotally mounted on the driven member and has a clutching surface engageable with the outer surface of the drum; the pivotal mounting of the shoe on the driven member is provided at a location removed from the clutching surface, and suitable spring means are provided to bias the clutching surface against the drum.

The mass of the shoe is arranged about the pivot means to cause centrifugal force to act equally on the shoe on opposite sides of the pivot means. This has the result of causing a constant biasing force to be exerted by the spring means on the clutching surface regardless of whether there is rotation of the driven member. Together with this, in one aspect of our invention, we contemplate the provision of means for selectively decreasing the shoe mass subject to centrifugal force on the other side of the pivot from the clutching surface relative to the shoe mass subject to centrifugal force which is on the same side of the pivot as the clutching surface. In other words, we cause a net centrifugal force to be exerted on the same side of the pivot as the clutching surface so that at a predetermined lower speed the torque transmission becomes zero and therefore no further speed increase is possible. This then has the result of permitting the selection of a predetermined low speed for each particular net excess of mass of the shoe on the same side of the pivot as the clutching surface.

Another aspect of our invention is the arrangement of the clutching surface so that the major part of it falls between a tangential line drawn from the pivot axis of the shoe to the outer surface of the drum and a line passing through the axis of rotation out to the pivot axis. This causes a compressive effect on the clutching surface for only one direction of rotation; as a result, the clutching surface tends to "grab" in that direction, that is, to engage the drum with greater force and transmit a greater torque than for the other direction of rotation.

The subject matter which we regard as our invention is particularly pointed out and distinctly claimed in the concluding portion of this specification. Our invention, however, both as to organization and method of operation together with further objects and advantages thereof, may best be understood by reference to the following description taken in conjunction with the accompanying drawings.

In the drawings, FIGURE 1 is a side elevational view of a clothes washing machine including our invention, the view being partially broken away and partially in section to illustrate details;

Figure 1:
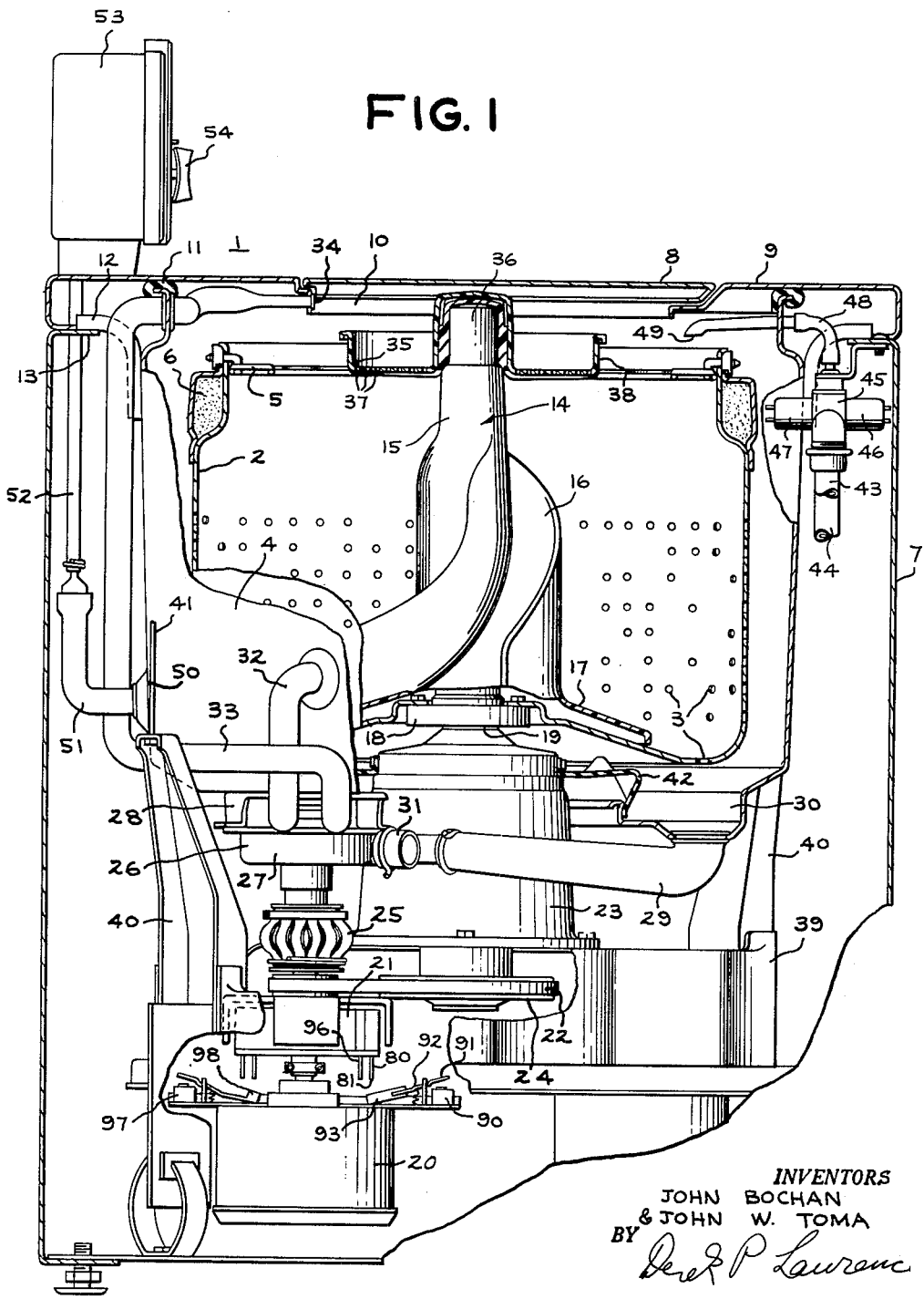

Referring now to FIGURE 1, we have shown our invention incorporated in a washing machine since this represents a particularly good use of our novel clutch and, in fact, there is a novel and useful relationship between the various parts of the washing machine and the clutch itself. In FIGURE 1 there is shown an agitator-type clothes washing machine 1, having a conventional basket or clothes receiving receptacle 2, provided over its side and bottom walls with perforations 3 and disposed within an outer imperforate tub or casing 4. Tub 4 serves as a liquid receptacle, the basket and tub together serving in effect as container means for clothes and the liquid in which they are to be washed and rinsed. Basket 2 may be provided with a suitable clothes retaining member 5 for preventing clothes from being floated over the top of the basket and with a balance ring 6 to help steady the basket when it is rotated at high speed.

Tub 4 is rigidly mounted within an appearance cabinet 7 which includes a cover 8 hingedly mounted on the top portion 9 of the cabinet for providing access to an opening 10 to the basket 2. A gasket 11 may be provided so as to form a seal between the top of tub 4 and portion 9 of the cabinet thereby to prevent escape of moisture and moist air into the cabinet around the tub. The rigid mounting of tub 4 within the cabinet 7 may be effected by any suitable means. As a particular example of one such means, we have provided strap members 12, each of which is secured at one end to an inturned flange 13 of the cabinet and at its other end to the outside of tub 4. At the center of basket 2 there is positioned a vertical axis agitator 14 which includes a center post 15 and a plurality of curved water circulating vanes 16 joined at their lower ends by an outwardly flared skirt 17.

Both the clothes basket 2 and the agitator 14 are rotatably mounted. The basket is mounted on a flange 18 of a rotatable hub 19, and the agitator 14 is mounted on a shaft (not shown) which extends upwardly through the hub 19 and through the center post 15 and is secured to the agitator so as to drive it.

During a typical cycle of operation of the machine 1, water is introduced into the tub 4 and basket 2, and agitator 14 is then oscillated back and forth on its axis, that is, in a horizontal plane within the basket. This causes washing of the clothes by effecting relative motion of the clothes to the liquid, as well as suitable flexing of the fabric of the clothes. Then, after a predetermined period of this washing action basket 2 is rotated at high speed to extract centrifugally the washing liquid from the clothes and discharge it to drain. Following this extraction operation clean water is introduced into the basket for rinsing the clothes and the agitator is again oscillated. Finally the basket is once more rotated at high speed to extract the rinse water.

Basket 2 and agitator 14 may be driven through any suitable means from a reversible motor. By way of example, we have shown them as driven from a reversing motor 20 through a system including our improved clutch 21 mounted on the motor shaft. A suitable belt 22 transmits power from clutch 21 to a transmission assembly 23 through a pulley 24. Thus, depending upon the direction of motor rotation, pulley 24 of transmission 23 is driven in opposite directions. The transmission 23 is so arranged that it supports and drives both the agitator drive shaft and basket mounting hub 19. When motor 20 is rotated in one direction the transmission causes agitator 14 to oscillate in a substantially horizontal plane within basket 2. Conversely, when motor 20 is driven in the opposite direction the transmission rotates wash basket 2 and agitator 14 together at high speed for centrifugal liquid extraction. While the specific type of transmission mechanism used does not form part of our invention, reference is made to Patent 2,844,225 issued to James R. Hubbard et al. on July 22, 1958 and owned by the General Electric Company, assignee of the present invention. That patent discloses in detail the structural characteristics of a transmission suitable for use in the illustrated machine.

In addition to operating transmission 23 as described, motor 20 also provides a direct drive through a flexible coupling 25 to a pump structure generally indicated at 26 which may include two separate pump units 27 and 28 both operated simultaneously in the same direction by motor 20. Pump 27 has an inlet which is connected by a conduit 29 to an opening 30 formed at the lowermost point of the tub 4. Pump 27 also has an outlet which is connected by a conduit 51 to a suitable drain (not shown). Pump 28 has an inlet connected by a conduit 32 to the interior of tub 4 and an outlet connected by a conduit 33 to a nozzle 34. The pumps are formed so that in the spin direction of motor rotation the pump will draw in liquid from opening 30 through conduit 29 and discharge it through conduit 31 to drain, and in the other direction of rotation pump 28 will draw in liquid through conduit 32 and discharge it through conduit 33 and nozzle 34, each of the pumps being substantially inoperative in the direction of rotation in which it is not used.

Nozzle 34 is positioned for discharge into a filter pan 35 secured on the top portion 36 of agitator 14 so as to be movable therewith. With this structure then, when the motor is rotating so as to provide agitation, pump 28 draws liquid through conduit 32 from tub 4 and discharges it through conduit 33 so that the liquid passes from nozzle 34 into filter pan 35 and then down through a number of small openings 37 provided in the bottom of the filter pan and back into basket 2. In this manner, the filter pan 35 with small openings 37 and the upstanding side wall 38 causes lint which is separated from the clothes during the washing operation to be filtered out of the clothes, and thus prevents it from being redeposited on the clothes. This type of structure is more fully described and claimed in patent 2,481,979 issued to Russell H. Colley on September 13, 1949 and assigned to General Electric Company, owner of the present invention.

The motor 20, clutch 21, transmission 23, basket 2 and agitator 14 form a suspended washing and centrifuging system which is supported by the stationary structure of the machine so as to permit isolation of vibrations from the stationary structure. It will be understood that such vibrations occur primarily as a result of high speed spinning of basket 2 and a load of clothes therein as mentioned above. While any siutable suspension structure may be used, one suitable structure includes a bracket member 39 with transmission 23 mounted thereon and motor 20 mounted to the underside thereof. The bracket member in turn is secured to upwardly extending rigid members 40, and each of the two upwardly extending members 40 is connected to a cable 41 supported from the top of the machine. While only a portion of the suspension system is shown in FIGURE 1, such a vibration isolation system is fully described and claimed in Patent 2,987,190 issued on June 6, 1961 to John Bochan and assigned to General Electric Company, assignee of the present invention.

In order to accommodate the movement which occurs between basket 2 and tub 4 without any danger of leakage between them the stationary tub 4 is joined to the upper part of transmission 23 by a flexible boot member 42. Boot 42 may be of any suitable configuration, many of which are known in the art, to permit relative motion of the parts to which it is joined without leakage therebetween.

Hot and cold water may be supplied to the machine through conduits 43 and 44 which are adapted to be connected respectively to sources of hot and cold water (not shown). Conduits 43 and 44 extend into a conventional mixing valve structure 45 having solenoids 46 and 47 so that energization of solenoid 46 permits passage of hot water through the valve to a hose 48. Energization of solenoid 47 permits passage of cold water through the valve, and energization of both solenoids permits mixing of hot and cold water in the valve and passage of warm water to hose 48. Hose 48 has an outlet 49 positioned to discharge into basket 2 so that when one or both of the solenoids 46 and 47 are energized, water passes into basket 2 and tub 4.

The level to which water rises in the basket and tub may be controlled by any suitable liquid level sensing means. One typical arrangement for doing this is to provide an opening 50 in the side of tub 4 adjacent the bottom thereof. Opening 50 is connected through a conduit 51 and a tube 52 to a conventional pressure sensitive switch (not shown) which may be positioned in the backsplasher 53 of machine 1. In the conventional manner, as the water rises in basket 2 and tub 4 it exerts increasing pressure on the column of air trapped in tube 52, and at a predetermined pressure level the column of air then operates the pressure sensitive switch to shut off whichever of solenoids 46 and 47 may be energized. Backsplasher 53 may have suitable manual controls, such as that shown at 54. Controls 54 are used to control, for instance, washing and spin speeds, water temperature, water level within tub 4 and basket 2, etc., for the washing of different types of fabrics.

The foregoing describes a complete washing machine, with clutch 21 in a particular relationship to the other parts of the driving apparatus. As will be more fully understood from an explanation of the structure of the clutch itself, a novel relationship is attained by this arrangement. The clutch itself may best be understood by reference to FIGURES 2, 3 and 4. As shown in particular in FIGURE 3, motor 20 has a shaft 55 extending vertically upward from it, and shaft 55 is clamped in a sleeve 56 by means of a conventional clamping structure 57. Press-fitted into the top of sleeve 56 is a shaft 58 on which is press-fitted a driving drum 59. Thus, drum 59 is rigidly secured to the motor shaft 55 so as to be rotated thereby and constitutes in effect the driving member of clutch 21.

Rotatably mounted on shaft 58 by means of an appropriate bearing structure such as that shown at 60 is the driven or output member 61 of the clutch. Output member 61 may conventionally include an output pulley 62 as an integral part thereof, the member 61 with its pulley 62 being coaxial with drum 59 by virtue of its being mounted on the shaft 58.

Figure 5:
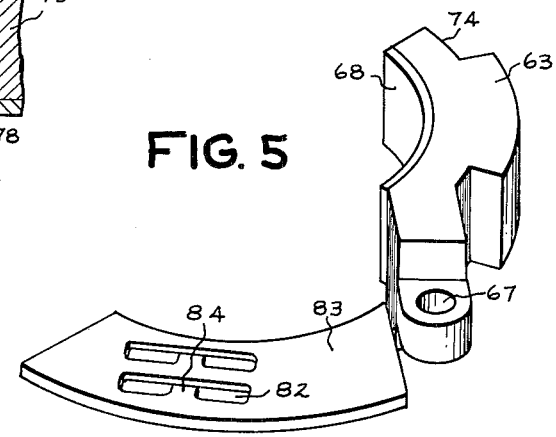
FIGURE 5 is a view in perspective of one component of our improved clutch.

A pair of clutch shoes 63 and 64 are provided, each of the two clutch shoes being pivotally mounted on a pair of pins 65 and 66 respectively secured to and extending from driven member 61. The precise shape of the clutch shoes is particularly well illustrated in FIGURE 5, wherein shoe 63 is shown in perspective. The pivotal mounting of shoe 63 on pin 65 is achieved by passage of the pin 65 through opening 67 provided in the shoe 63. Each of the two shoes has a clutching surface of suitable friction material provided, these being shown at 68 and 69 respectively for shoes 63 and 64.

Surfaces 68 and 69 are formed so as to have the same curvature as drum 59, thereby being engageable with the outer surface of the drum for clutching engagement therewith. For reasons to be fully discussed hereinafter, a substantial portion of clutching surface 68 is so arranged that it lies within the angular space between a line through the axis of rotation of the clutch and the pivot axis of member 63 and the point of tangency on the surface of drum 59 of a line drawn from the pivot axis of member 63. Either the near side, relative to the pivot axis, or the far side of the point of tangency may be used—in the present embodiment the near side has been selected, i.e., the location is between a radius from the axis of rotation to the pivot axis and the point of tangency. The same relationship is, of course, provided for the clutching surface 69 of member 64 with respect to drum 59.

The amount of torque which is transmitted to surfaces in frictional engagement with each other is, in addition to being dependent upon the coefficient of friction of the surfaces, also dependent upon the force with which these surfaces are forced toward each other. The biasing force causing the clutching surfaces 68 and 69 to engage drum 59 is provided by, respectively, a pair of springs 70 and 71. Driven member 61 is formed with suitable portions, such as that shown at 72 in connection with spring 70, forming seats for the outer ends of springs 70 and 71. The inner end of spring 70 is seated against an outer surface portion 73 of shoe 63 on the same side of pivot pin 65 as the clutching surfaces 68. The result is that spring 70 tends to bias shoe 63 inwardly, and force surface 68 against drum 59. Thus, the amount of torque which may be transmitted through the engaging clutching surfaces can be predetermined by providing a particular strength for springs 70 and 71, it being understood that spring 71 is identical to spring 70 in mounting and positioning, and that it biases surface 69 against drum 59 in the same way that spring 70 biases surface 68.

Figure 6:
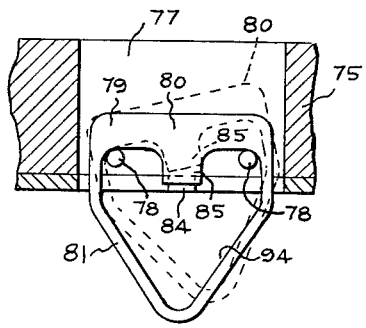
FIGURE 6 is a fragmentary side elevational view, partly in cross-section, of another component of our improved clutch.
Figure 4:
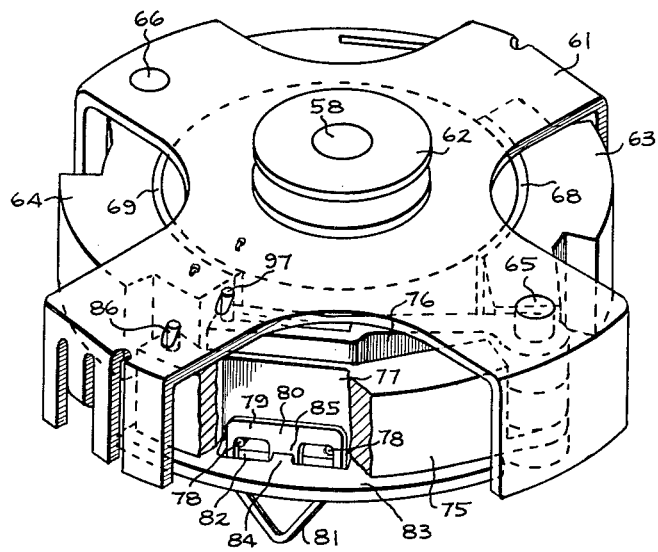
FIGURE 4 is a view in perspective, partly broken away and partly in cross section to illustrate details, of the improved clutch of our invention.
Figure 7:
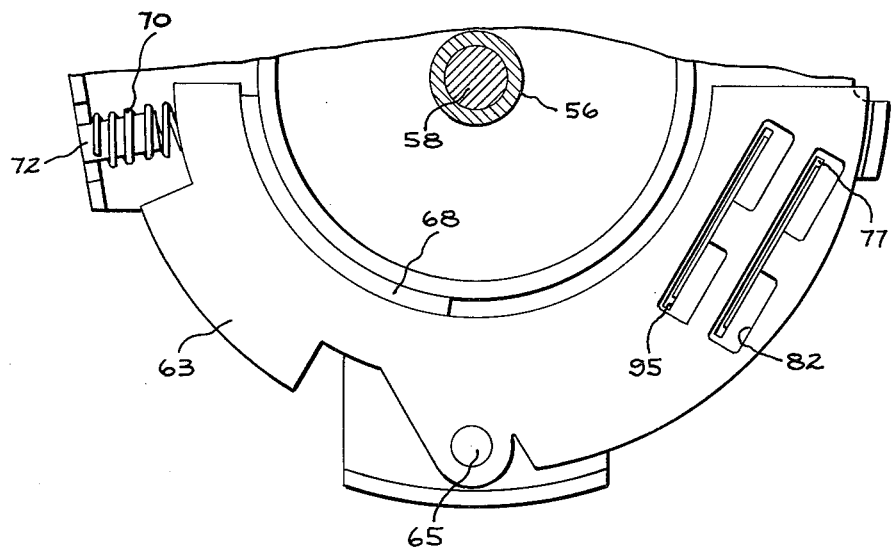
FIGURE 7 is a fragmentary bottom plan view of the improved clutch of our invention.

Secured on pin 65 for pivotal motion thereabout are a pair of auxiliary weight members 75 and 76. Referring particularly to weight 75, it can be seen in FIGURE 2 that there is a slot 77 provided therein. This slot is also shown in FIGURE 4, where member 75 has been broken away to show the interior of slot 77. Extending across the slot are a pair of support pins 78 on which is supported the top portion 79 of a latch member 80, the latch member being shown enlarged in FIGURE 6 for additional clarity.

Latch 80 has a lower portion 81 which extends down through a slot 82 formed in a portion 83 (see also FIGURE 5) of member 63 on the opposite side of the pivot axis from clutching surface 68. Slot 82 is provided with a central projecting portion 84 so that the slot is narrowed at its center. Returning to FIGURES 4 and 6, member 80 has a central depending tab 85 which is aligned with projection 84.

Figure 2:
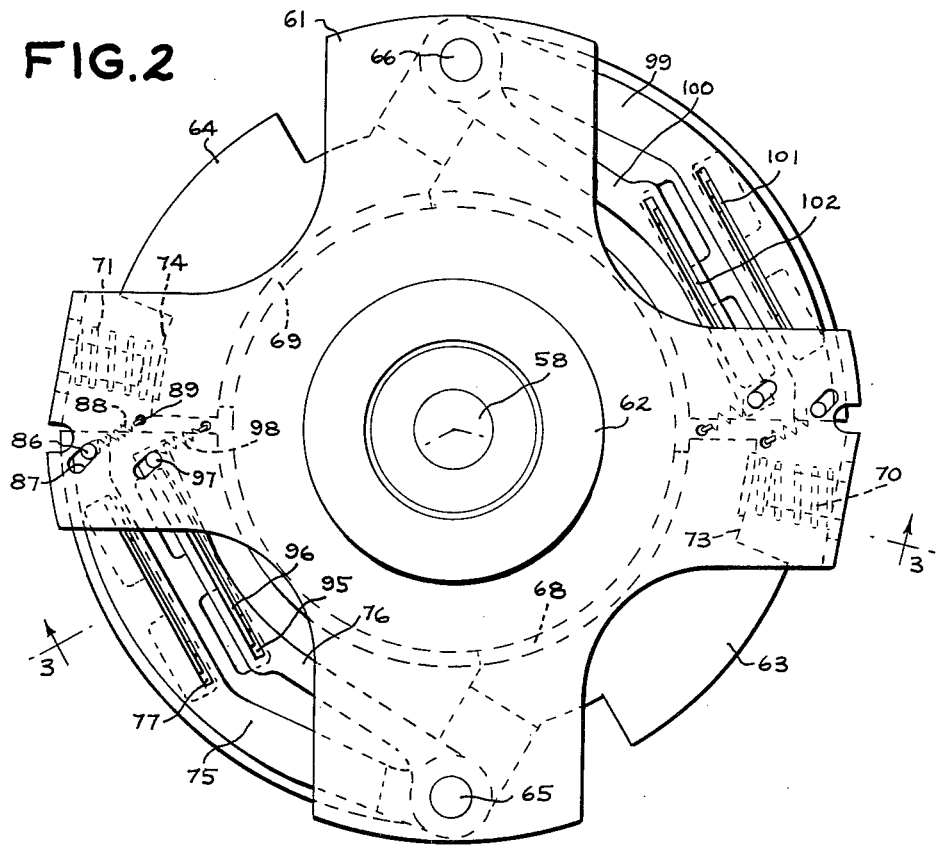
FIGURE 2 is a plan view of the improved clutch of our invention as used in the washing machine of FIGURE 1.
Figure 3:
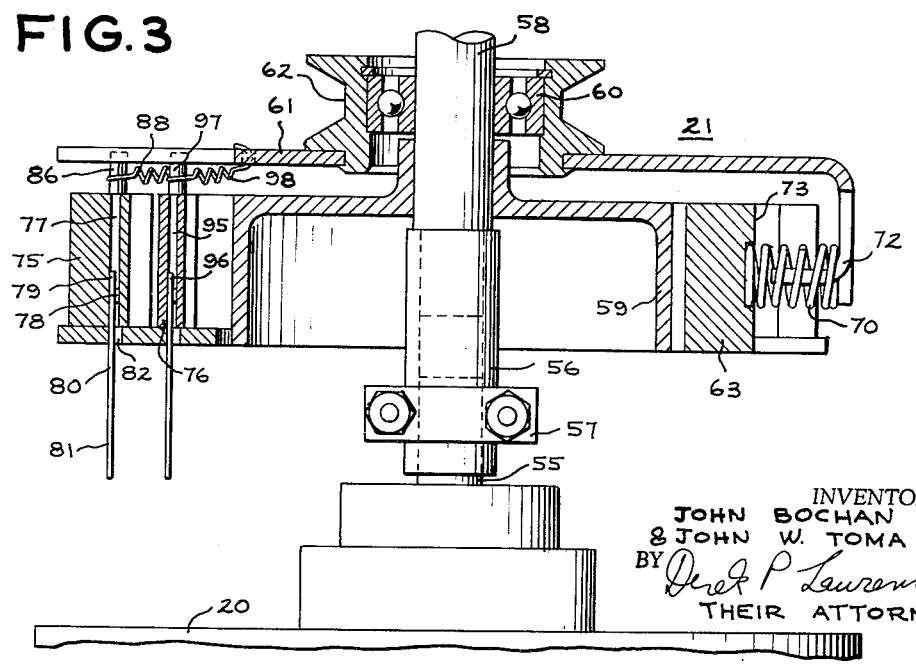
FIGURE 3 is a view along line 3—3 in FIGURE 2.

As best shown in FIGURES 2 and 3, member 75 has an upwardly extending pin 86 which is positioned to move in a slot 87 formed in member 61. A very light spring 88 has one end connected to pin 86 and the other end connected at point 89 (FIGURE 2) located on member 61 radially inward of slot 87. This biases weight 75 so that it tends to pivot inwardly about pin 65, the pivoting movement being limited by engagement of latch member 80 with the radially inward edge of slot 82. As soon as rotation of driven member 61 starts, the very weak spring 88 is overcome (this actually occurs at only 10 or 15 r.p.m.), and weight 75 moves outwardly until tab 85 engages projection 84 of portion 83 of shoe 63. This causes shoe 75 to become, in effect, part of shoe 63 insofar as the centrifugal force acting on the shoe is concerned. In other words, by the engagement of mass 75 to part 83 through tab 85 of member 80 and projection 84, it is as though the weight 75 had become an integral part of the shoe for practical purposes.

However, this result can readily be changed by energization of a coil 90 (FIGURE 1) to draw down the end 91 of an arm 92. This causes the other end 93 of the arm to pivot up so that it is in a position where it engages the bottom portion 81 of latch member 80 when the latch member is in the position shown in solid outline in FIGURES 4 and 6. This engagement of part 93 with latch 80 knocks the latch member up into the cocked position shown in dotted outline in FIGURE 6. This result is obtained regardless of the direction of rotation of member 61 by the V-shaped formation of the bottom of latch 80; the latch will either be moved to the position shown in dotted outline or to the precisely opposite position.

It will be observed at this point that the hollow interior portion 94 of member 80 is sufficiently large so as to permit freely the raising of latch member 80 when engaged by part 93. It will further be observed that, when latch member 80 is in its raised position, the tab 85 is above the projection 84 in part 83. As a result, when at a very low speed of rotation, the weight 75 moves outwardly as described, the latch member 80 will move outwardly with shoe 75, if coil 90 is energized, so that tab 85 is over the projection 84. This prevents the latch member 80 from dropping back to its normal position (as shown in solid outline in FIGURES 4 and 6) because tab 85 rests on the top of projection 84.

With latch 80 moved to its cocked position, as shown in dotted outline, tab 85 does not engage projection 84 as described, and the weight is therefore free to move outwardly in response to centrifugal force until stopped by some other obstacle. In this case, the stopping is effected by engagement of pin 86 with the outer end of slot 87. This, then, causes centrifugal force acting on weight 75 to force it outwardly against a part of member 61 rather than against a part of the shoe 63. The result of this is that the centrifugally caused force of weight 75 does not affect shoe 63. Thus, weight 75 may be selectively included or excluded from shoe 63 insofar as the effect of centrifugal force is concerned. With latch member 80 in the position shown it is included, and with latch member 80 on its cocked position it is excluded.

The same relationship of parts is provided for weight 76. In other words it has a slot 95 formed therein, with a latch member 96 positioned in the slot. A pin 97 is biased by a spring 98 to move weight 76 to an inward position when member 61 is not rotating. Again, by virtue of the relationship of the parts, weight 76 becomes in effect part of shoe 63 if latch 96 is not cocked, and it does not become a part of shoe 63 if the latch member 96 is cocked. The cocking of latch 96 may be effected by a second coil 97 (FIGURE 1) which acts on a part 98, in the same manner as previously described in connection with coil 90 and part 93. In other words, when coil 97 is energized part 98 rises to engage the bottom of latch 96 and cock it to a position like that shown for latch 80 in FIGURE 6.

An identical structure to weights 75 and 76 is provided in connection with shoe 64. In other words, a pair of weights 99 and 100 are provided. Weight 99 has a latch 101 and weight 100 has a latch 102. Each of these weights is biased to a radially inward position with respect to the axis of rotation but pivots outward at a very low speed, and responds to centrifugal force as a part of shoe 64 if the latch is not cocked, but acts entirely separately from shoe 64 if the latch has been cocked.

When both weights are included with each shoe, that is, weights 75 and 76 are part of shoe 63 and weights 99 and 100 are part of shoes 64, the masses of the shoes are such that there is an equal centrifugal force acting on each side of the pivot point of each shoe. In other words, the masses are matched so that the centrifugal force tending to pivot part 83 and the two shoes 75 and 76 outwardly is the same as the centrifugal force tending to pivot outwardly the part of shoe 63 which has the clutching surface 68 provided at the inner surface thereof. What this means, in effect, is that the total centrifugal force acting on clutching surface 68 is zero inasmuch as there are equal forces pushing outwardly on the two opposite sides of the pivot pin 65. The result is that the only force which acts on the clutch surface at any speed is the biasing spring 70. Thus, with a predetermined spring force for spring 70 a predetermined torque transmission capability is provided for our improved clutch when both auxiliary weights are included with each shoe.

When a speed lower than full speed is desired, one or the other of coils 90 or 97 may be energized long enough to cock the two latches with which it is associated, it being understood that latches 80 and 101 are associated with coil 90 and latches 96 and 102 are associated with coil 97. As previously described, the cocking of the latches for one group of auxiliary weights precludes those weights from being included as part of the shoes insofar as the effect of centrifugal force is concerned. Therefore, there is a net centrifugal force acting on the same side of the pivot pin as the clutching surface, but in a direction opposite to that of the spring biasing the clutching surface against drum 59.

This means that at a certain speed, predetermined by the excess of mass on the same side as the clutching surface over the mass on the side of the pivot opposite to the clutching surface, the torque transmission will become zero and there will therefore be no further increase in the speed of the driven member regardless of the speed at which the driving member is operated. Thus, an intermediate speed is readily achieved by the structure.

In addition, a second intermediate speed may be achieved by energizing coil 97 rather than coil 90, the assumption being made that inner weights 76 and 100 are different from outer weights 75 and 99 so that a different predetermined speed will be provided by the unbalance caused by the removal of the inner weights from the shoes. In fact, a fourth, and lowest, speed may be achieved by cocking both the inner and outer latches by energization of coils 90 and 97 so that centrifugal force acts only on the part shown in FIGURE 5, that is, on part 83 on one side of the pivot axis and on the entire remainder of the shoe on the other side of the pivot axis.

It will thus be seen that our invention provides a structure wherein a maximum speed may be provided which is entirely independent of centrifugal force, and wherein a predetermined torque transmission capability is provided at all speeds. Also, added lower speeds may be provided by selectively causing the centrifugal force on the same side of the pivot as the clutching surface to be greater than the net centrifugal force on the other side of the pivot. This is achieved in the present case by the provision of auxiliary weights which may be included or excluded on the other side of the pivot from the clutching surface. It will, of course, be understood that the same effect may be achieved if the shoes were balanced and then weights were added on the same side as the clutching surface rather than being subtracted from the other side, and that this too falls within the scope of our invention. In other words, adding weight to a shoe on the same side as the clutching surface is, in effect, a relative decrease in the weight on the other side of the pivot axis.

A further important aspect of our invention resides in the provision of a centrifugal type of clutch which provides different torque transmission capabilities for different directions of rotation. This occurs as a result of the positioning of the clutching surfaces as previously described. It will be recalled that the clutching surface for each shoe is arranged so that a major part of it is between a radius from the center of rotation of the clutch to the pivot axis of the shoe and between the point where a tangential line from the pivot axis touches the outer surface of drum 59. This positioning of the clutching surfaces causes a compressive force to be exerted when the direction of rotation is counterclockwise as viewed in FIGURE 2, i.e., when the clutching surface leads the pivot axis. Of course, as previously stated, the same result would be achieved if the clutching surface were on the other side of the point of tangency from the pivot point—the only difference is that the compressive force would be exerted for the opposite direction of rotation.

The result of this compressive force is that there is a tendency for the surfaces to "grab," and a greater torque is transmitted than when the rotation is in the opposite direction where there is no compressive stress as a result of the direction of rotation and the force comes only from the springs.

This is a most important feature of the clutch as applied to a washing machine. When the agitator 14 is to be operated, it is important that there be no slipping of the clutch since the full agitation action desired should be provided. This is effected by causing the counterclockwise direction of rotation, as viewed in FIGURE 2, to be provided for agitation and a greater torque to be provided.

It is equally important, when a centrifugal extraction operation is to be provided in machine 1, that slippage be readily permitted so that the basket may come up to speed slowly. This is important in order to protect motor 20 which would otherwise have the task of rapidly accelerating a very large mass to high rotational speed. This is avoided by the slipping effect achieved when there is a heavy load to be driven and the rotation is in a clockwise direction (as viewed in FIGURE 2). The net result is that the basket will be brought up to speed slowly until the torque transmission required is down within the limitations prescribed by the design of the clutch and of the biasing spring, at which point the clutch will operated as previously described. It is believed to be a novel approach in a washing machine to use a centrifugal clutch which inherently, by selection of agitation or spin, provides a greater or lesser torque transmission capability from the motor to the transmission.

There are thus two highly important aspects to our invention: first, the provision of a multiple speed centrifugal clutch wherein, at the maximum speed, a constant biasing force is exerted regardless of speed, and the provision of a structure in which the amount of torque transmission is dependent upon the direction of rotation, being greater for one direction than for the other.

While in accordance with the patent statutes we have described what at present is considered to be the preferred embodiment of our invention, it will be obvious to those skilled in the art that various changes and modifications may be made thereto without departing from the invention, and we therefore aim in the appended claims to cover all such changes and modifications as fall within the true spirit and scope of our invention.

What we claim as new and desire to secure by Letters Patent of the United States is:

1. A multi-speed clutch comprising:
   (a) an input drum;

(b) a driven output member coaxial with said drum;
(c) a clutch shoe mounted on said driven member and having a clutching surface engageable with said drum;
(d) pivot means supporting said shoe on said driven member at a location angularly removed from said surface;
(e) spring means biasing said surface against said drum;
(f) the mass of said shoe being arranged about said pivot means so that centrifugal force acts equally on said shoe on opposite sides of said pivot means thereby causing said spring means to exert a constant biasing force on said surface independently of rotation of said driven member;
(g) and mass-changing means for selectively providing an excess of shoe mass subject to centrifugal force on the same side of said pivot means as said surface relative to the shoe mass subject to centrifugal force which is on the other side of said pivot means from said surface.

2. The clutch defined in claim 1 wherein said mass-changing means comprises at least one auxiliary weight, and means for selectively coupling said auxiliary weight to said shoe and uncoupling it from said shoe.

3. The clutch defined in claim 2 wherein said auxiliary weight is positioned on the other side of said pivot means from said surface whereby coupling said auxiliary weight causes centrifugal force to act equally on said shoe on opposite sides of said pivot means and uncoupling said auxiliary weight from said shoe causes the net mass of said shoe on the same side of said pivot means as said surface to be greater.

4. The clutch defined in claim 2 wherein said auxiliary weight is also pivotally mounted on said pivot means.

5. A multi-speed clutch comprising:
(a) an input drum;
(b) a driven output member coaxial with said drum;
(c) a clutch shoe mounted on said driven member and having a clutching surface engageable with said drum;
(d) pivot means supporting said shoe on said driven member at a location angularly removed from said surface;
(e) spring means biasing said surface against said drum;
(f) the mass of said shoe being arranged about said pivot means so that centrifugal force acts equally on said shoe on opposite sides of said pivot means thereby causing said spring means to exert a constant biasing force on said surface independently of rotation of said driven member;
(g) and mass-changing means for selectively decreasing the shoe mass subject to centrifugal force on the the other side of said pivot means from said surface relative to the shoe mass subject to centrifugal force which is on the same side of said pivot means as said surface, said mass-changing means including an auxiliary weight member pivoted on said pivot means and extending on the other side of said pivot means from said surface, said auxiliary weight also including a latch member extending therefrom, said latch member being biased to a position wherein it connects said auxiliary weight to said shoe, and means for moving said latch member to a second position wherein movement of said auxiliary weight in response to centrifugal force is prevented by said driven member and said auxiliary weight is thereby prevented from forming a part of said shoe.

6. The clutch defined in claim 5 including spring means lightly biasing said auxiliary weight to a radially inward position, said shoe being formed to retain said latch in said second position once it has been moved to said second position substantially as long as rotation of said driven member continues.

References Cited by the Examiner

UNITED STATES PATENTS

| 1,220,901 | 3/17 | States. |
| 1,227,475 | 5/17 | Matheeuwissen. |
| 2,107,341 | 2/38 | Peo _____ 192—104 |
| 2,869,699 | 1/59 | Bochan. |

FOREIGN PATENTS 1,204,485   8/94   France.

DAVID J. WILLIAMOWSKY, *Primary Examiner.*